US012691423B2

(12) United States Patent
Yu et al.

(10) Patent No.: US 12,691,423 B2
(45) Date of Patent: Jul. 28, 2026

(54) NaA ZEOLITE MEMBRANE FOR RECOVERY OF AMMONIA

(71) Applicant: Rensselaer Polytechnic Institute, Troy, NY (US)

(72) Inventors: Miao Yu, Pittsford, NY (US); Surya Padinjarekutt, Glen Mills, PA (US); Huazheng Li, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 978 days.

(21) Appl. No.: 17/776,047

(22) PCT Filed: Nov. 13, 2020

(86) PCT No.: PCT/US2020/060432
§ 371 (c)(1),
(2) Date: May 11, 2022

(87) PCT Pub. No.: WO2021/097221
PCT Pub. Date: May 20, 2021

(65) Prior Publication Data
US 2022/0387964 A1 Dec. 8, 2022

Related U.S. Application Data

(60) Provisional application No. 62/934,821, filed on Nov. 13, 2019.

(51) Int. Cl.
| | |
|---|---|
| *B01J 20/18* | (2006.01) |
| *B01D 53/22* | (2006.01) |
| *B01D 63/02* | (2006.01) |
| *B01D 69/10* | (2006.01) |
| *B01D 71/02* | (2006.01) |
| *B01J 19/24* | (2006.01) |
| *B01J 20/28* | (2006.01) |
| *B01J 20/32* | (2006.01) |
| *C01C 1/04* | (2006.01) |

(52) U.S. Cl.
CPC ....... *B01D 71/0281* (2022.08); *B01D 53/228* (2013.01); *B01D 53/229* (2013.01); *B01D 63/02* (2013.01); *B01D 69/106* (2022.08); *B01J 19/2465* (2013.01); *B01J 20/18* (2013.01); *B01J 20/28038* (2013.01); *B01J 20/3204* (2013.01); *B01J 20/3238* (2013.01); *B01J 20/3293* (2013.01); *C01C 1/0417* (2013.01); *C01C 1/0458* (2013.01); *B01D 2053/224* (2013.01)

(58) Field of Classification Search
CPC .............. B01D 71/0281; B01D 69/106; B01D 53/229; B01D 53/228; B01D 63/02; B01J 19/2465; B01J 20/18; B01J 20/28038; B01J 20/3204; B01J 20/3238; B01J 20/3293; C01C 1/0417; C01C 1/0458
See application file for complete search history.

(56) References Cited

U.S. PATENT DOCUMENTS

| | | | |
|---|---|---|---|
| 4,695,387 | A | 9/1987 | Berry et al. |
| 7,897,122 | B2 | 3/2011 | Tsotsis et al. |
| 8,067,327 | B2 | 11/2011 | Li et al. |
| 8,679,227 | B2 | 3/2014 | Falconer et al. |
| 8,709,254 | B2 | 4/2014 | Kreiter et al. |
| 8,992,842 | B2 * | 3/2015 | Gordon ................ C01C 1/0447 |
| | | | 422/177 |
| 9,126,830 | B2 | 9/2015 | Tang et al. |
| 9,493,408 | B2 | 11/2016 | Eliasson et al. |
| 10,189,716 | B2 | 1/2019 | Jones |
| 10,196,330 | B2 | 2/2019 | Vestre et al. |
| 10,427,107 | B2 | 10/2019 | Gu et al. |
| 10,946,333 | B2 * | 3/2021 | Tanaka .................. B01D 53/22 |
| 2010/0071559 | A1 * | 3/2010 | Miachon ............ B01D 71/0281 |
| | | | 96/135 |
| 2014/0263061 | A1 | 9/2014 | Taylor et al. |
| 2014/0360939 | A1 | 12/2014 | Yamada et al. |
| 2015/0014232 | A1 | 1/2015 | McGinnis et al. |

OTHER PUBLICATIONS

Liu et al., RSC Advances, (2015), v.5, 95866(1-6).*
International Search Report and The Written Opinion of the International Searching Authority, International Application No. PCT/US2020/060432, mailed Feb. 12, 2021.
Jiang, Z., et al., "Synthesis of pure NaA zeolites from coal fly ashes for ammonium removal from aqueous solutions," Clean Technologies and Environmental Policy, vol. 18, pp. 629-637, Nov. 30, 2015.

* cited by examiner

Primary Examiner — Yong L Chu
(74) Attorney, Agent, or Firm — Barclay Damon LLP; Anthony P. Gangemi

(57) ABSTRACT

Ammonia is made in a system that includes a conversion reactor for performing a Haber-Bosch process. Effluent streams from the conversion reactor, which include an ammonia component and excess hydrogen and nitrogen reactants, are fed to a membrane separator that includes NaA zeolite membranes disposed on one or more hollow porous supports. The NaA zeolite membranes are highly selective for the ammonia component, allowing the ammonia to be collected from a lumen of the membranes as a product and enriching the excess hydrogen and nitrogen reactants for reuse in the conversion reactor. These systems and the methods of their use are effective to replace and/or modify the energy-intensive condensation/recycling steps in the traditional Haber-Bosch process used to condense NH3 from the exiting stream of the reactor. The selective removal of ammonia by high quality NaA membranes helps to shift the ammonia evolution reaction.

8 Claims, 6 Drawing Sheets

300

302 — providing a porous support

304 — applying a plurality of zeolite crystal seeds to the porous support to form a seeded support 306 — heating the seeded support at a temperature above about 150°C 308 — growing a zeolite membrane on the seeded support

300

302 — providing a porous support

304A — dip-coating the porous support in a zeolite crystal seed solution

304B — drying the coated porous support

306 — heating the seeded support at a temperature above about 150°C

308 — growing a zeolite membrane on the seeded support

400

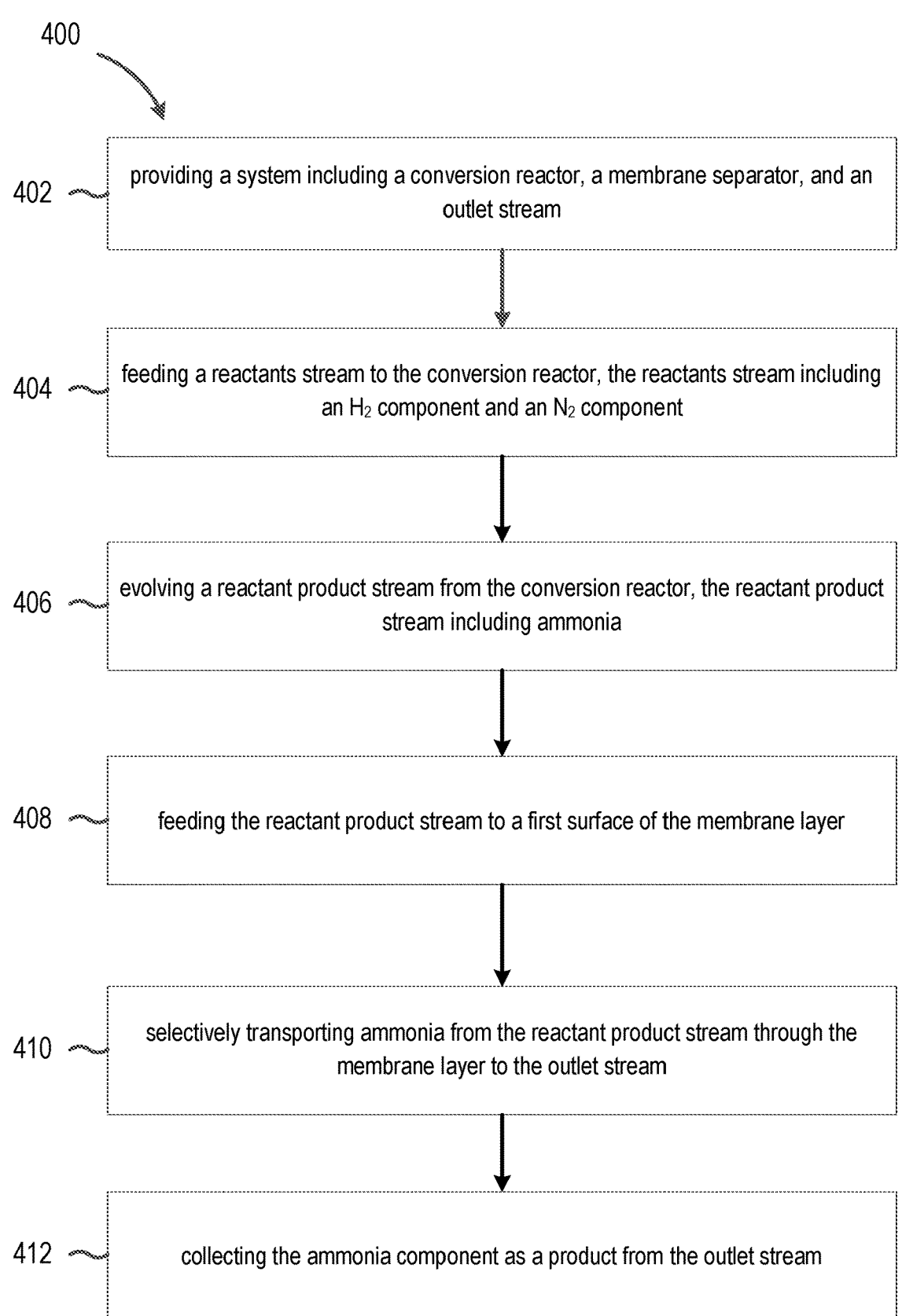

402 — providing a system including a conversion reactor, a membrane separator, and an outlet stream 404 — feeding a reactants stream to the conversion reactor, the reactants stream including an $H_2$ component and an $N_2$ component 406 — evolving a reactant product stream from the conversion reactor, the reactant product stream including ammonia 408 — feeding the reactant product stream to a first surface of the membrane layer 410 — selectively transporting ammonia from the reactant product stream through the membrane layer to the outlet stream 412 — collecting the ammonia component as a product from the outlet stream

FIG. 4

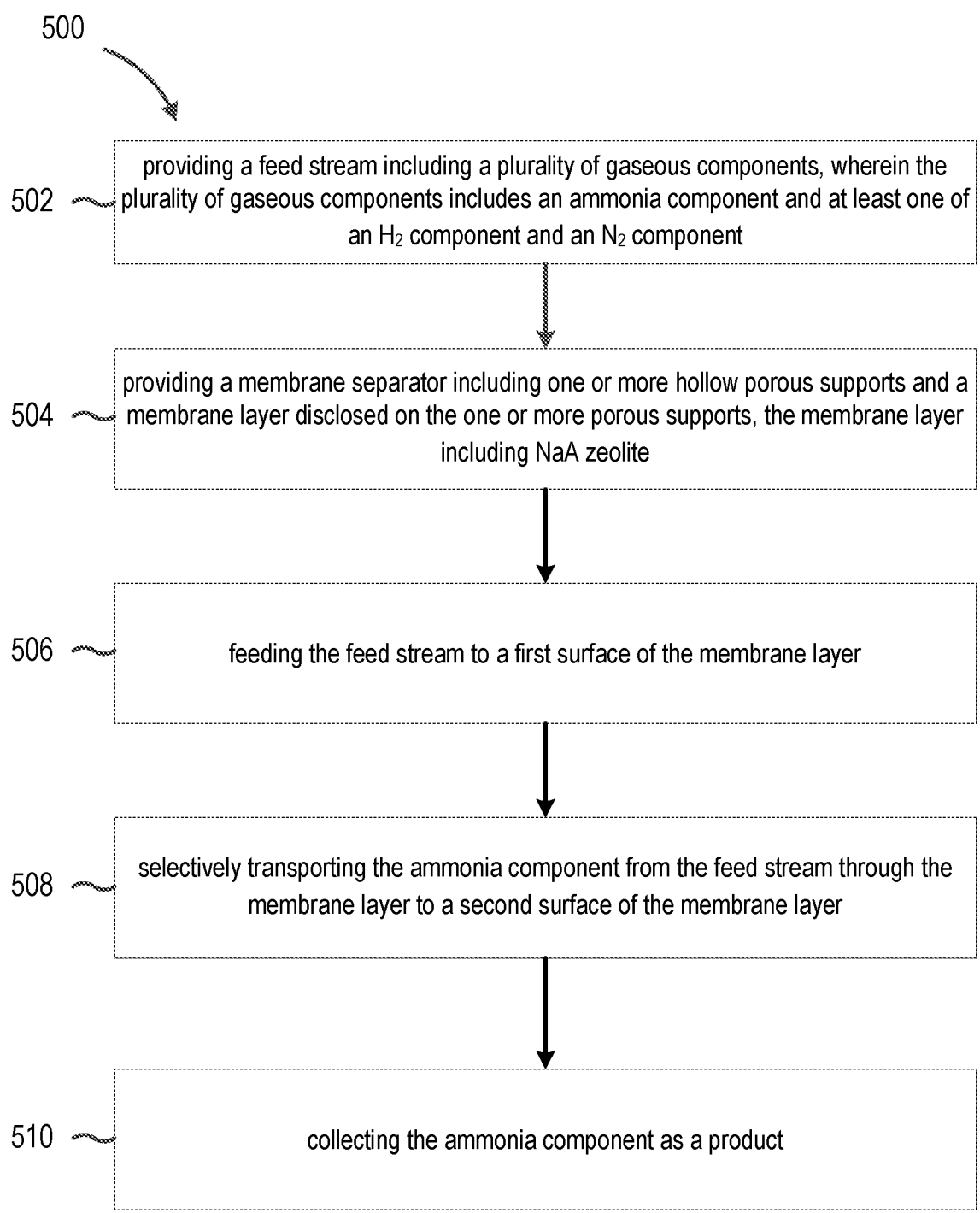

500

502 — providing a feed stream including a plurality of gaseous components, wherein the plurality of gaseous components includes an ammonia component and at least one of an H₂ component and an N₂ component 504 — providing a membrane separator including one or more hollow porous supports and a membrane layer disclosed on the one or more porous supports, the membrane layer including NaA zeolite 506 — feeding the feed stream to a first surface of the membrane layer 508 — selectively transporting the ammonia component from the feed stream through the membrane layer to a second surface of the membrane layer 510 — collecting the ammonia component as a product

FIG. 5

NaA ZEOLITE MEMBRANE FOR RECOVERY OF AMMONIA

CROSS REFERENCE TO RELATED APPLICATION(S)

This application claims the benefit of U.S. Provisional Application No. 62/934,821, filed Nov. 13, 2019, which is incorporated by reference as if disclosed herein in its entirety.

BACKGROUND

Ammonia ($NH_3$) is a widely produced chemical and plays a critical role in the manufacturing of fertilizers, dyes and cleaners. In 2010, 157.3 million metric tons of $NH_3$ were produced worldwide which accounted for ~1% of the global $CO_2$ emissions (451 million metric tons of $CO_2$). This is greater than any other industrial synthesis reaction. The production of $NH_3$ is expected to increase as the demand for $NH_3$-based fertilizers grows.

The primary synthesis method of $NH_3$ is the Haber-Bosch process, where pressurized $N_2$ and $H_2$ gas, e.g., 20-35 MPa, are fed over a bed of one or more catalysts at high temperature, e.g., 300-550° C., and $NH_3$ is condensed out as reactor effluent and unconverted $N_2$ and $H_2$ is reheated. A drawback of this process is that the tradeoff between reaction thermodynamics and kinetics results in low reaction yields (10-15% for a single pass through the reactor) despite large capital costs. Additionally, after a reaction cycle, the produced $NH_3$ is removed by energy-intensive condensation while excess $N_2$ and $H_2$ reheated and recycled back into the reactor.

Solutions producing lower costs and emissions have recently focused on finding more efficient synthesis catalysts or using new materials like adsorbents where $NH_3$ can be removed from the product stream. However, these new technologies still have many drawbacks. New catalysts, like ruthenium-based catalysts, still require high temperatures to achieve similar conversions to more traditional iron-based catalysts. The issue with absorbents is that at some point they will reach a saturation point, meaning that large quantities of these materials need to be used in order to absorb all the synthesized $NH_3$. An adsorbent would also require additional desorption steps for the adsorbent to be reused. As such, these methods are not continuous and require additional energy for desorption of the $NH_3$, making them less economically feasible and attractive to industry.

SUMMARY

Some embodiments of the present disclosure include a system for producing ammonia including a conversion reactor that includes one or more inlets, the one or more inlets including an $H_2$ feed stream and an $N_2$ feed stream. In some embodiments, the conversion reactor includes a heat source and one or more effluent streams including an amount of ammonia. In some embodiments, the system includes a membrane separator including NaA zeolite and configured to selectively remove ammonia from at least one of the one or more effluent streams, and an outlet stream in fluid communication with the membrane separator, the outlet stream including ammonia. In some embodiments, the membrane separator is maintained at a temperature below about 200° C. In some embodiments, the membrane separator is maintained at a pressure between about 40 psig and about 510 psig. In some embodiments, the system includes a recycle stream in fluid communication with the membrane separator and the one or more inlets, the recycle stream including a concentration of $H_2$ and $N_2$. In some embodiments, the membrane separator includes one or more porous supports and the membrane including NaA zeolite on the one or more porous supports, wherein one or more porous supports include a tubular sidewall having an external surface and an internal surface, wherein the membrane is disposed on the exterior surface and the interior surface encloses a lumen. In some embodiments, the one or more porous supports include hollow ceramic fibers. In some embodiments, the membrane separator is produced by a method including providing the porous support, applying a plurality of NaA zeolite crystal seeds to the porous support to form a seeded support, heating the seeded support at a temperature above about 200° C., and growing an NaA zeolite membrane on the seeded support. In some embodiments, the zeolite crystal seeds are sized between about 20-250 nm.

Some embodiments of the present disclosure are directed to a method of separating ammonia from a gaseous mixture, including providing a feed stream including a plurality of gaseous components, wherein the plurality of gaseous components includes an ammonia component and at least one of an $H_2$ component and an $N_2$ component. In some embodiments, the method includes providing a membrane separator that includes one or more hollow porous supports and a membrane layer disclosed on the one or more porous supports, the membrane layer including NaA zeolite. In some embodiments, the method includes feeding the feed stream to a first surface of the membrane layer. In some embodiments, the method includes selectively transporting the ammonia component from the feed stream through the membrane layer to a second surface of the membrane layer. In some embodiments, the method includes collecting the ammonia component as a product.

In some embodiments, the membrane layer is generally annularly shaped with an outer surface and an inner lumen, wherein the first surface is the outer surface, the second surface is adjacent the inner lumen, and the ammonia component is collected in the inner lumen. In some embodiments, the feed stream is fed at a temperature below about 200° C. In some embodiments, the feed stream is fed at a pressure between about pressure between about 40 psig and about 510 psig. In some embodiments, the feed stream includes reaction products from a Haber-Bosch reaction. In some embodiments, the Haber-Bosch reaction is performed in a conversion reactor, and any $H_2$ component or $N_2$ component is recycled to the conversion reactor.

Some embodiments of the present disclosure are directed to a method of making ammonia, including providing a system including a conversion reactor, a membrane separator including one or more hollow porous supports, and a membrane layer disclosed on the one or more hollow porous supports, the membrane layer including NaA zeolite, and an outlet stream in fluid communication with the membrane separator.

In some embodiments, the method includes feeding a reactants stream to the conversion reactor, the reactants stream including an $H_2$ component and an $N_2$ component, evolving a reactant product stream from the conversion reactor, the reactant product stream including ammonia, feeding the reactant product stream to a first surface of the membrane layer, selectively transporting ammonia from the reactant product stream through the membrane layer to the outlet stream, and collecting the ammonia component as a product from the outlet stream. In some embodiments, the membrane layer is generally annularly shaped with an outer surface and an inner lumen, wherein the first surface is the outer surface, and the outlet stream is in fluid communication with the inner lumen. In some embodiments, the reactant product stream is fed at a temperature below about 200° C. In some embodiments, the reactant product stream is fed at a pressure between about 40 psig and about 510 psig. In some embodiments, the reactant product stream includes reaction products from a Haber-Bosch reaction. In some embodiments, the Haber-Bosch reaction is performed in the conversion reactor, and any $H_2$ component or $N_2$ component is recycled to the conversion reactor.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 4 is a chart of a method of making ammonia according to some embodiments of the present disclosure; and FIG. 5 is a chart of a method of separating ammonia from a gaseous mixture according to some embodiments of the present disclosure.

DESCRIPTION

Figure 1:
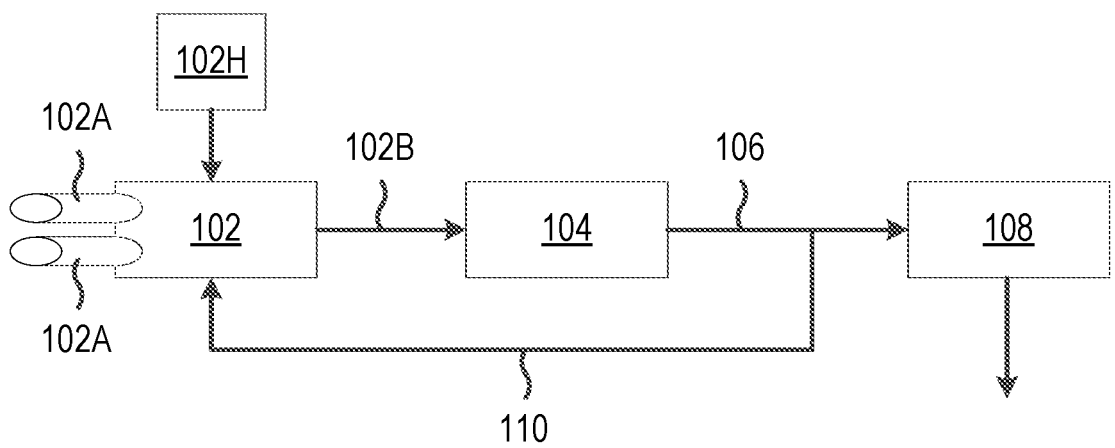
FIG. 1 is a schematic representation of a system for producing ammonia according to some embodiments of the present disclosure.

Referring now to FIG. 1, some embodiments of the present disclosure are directed to a system 100 for producing a desired product. In some embodiments, system 100 is configured to facilitate a reaction that generates the desired product, and also facilitate removal of unwanted components evolved during the reaction and/or are left over from the reaction. In some embodiments, system 100 is configured to isolate and/or purify the desired product. In some embodiments, the desired product is ammonia.

In some embodiments, system 100 includes a conversion reactor 102. In some embodiments, ammonia is formed via conversion reactor 102 from a Haber-Bosch process, as will be discussed in greater detail below. In some embodiments, conversion reactor 102 includes one or more inlets 102A. The one or more inlets 102A are configured to provide one or more reactants to conversion reactor 102. In some embodiments, the one or more reactants are provided via a reactant source, e.g., fresh reactant, waste streams, etc. In some embodiments, the one or more reactants are included as a recycle stream evolved elsewhere in system 100, as will be discussed in greater detail below. In some embodiments, one or more inlets 102A include an $H_2$ feed stream. In some embodiments, one or more inlets 102A include an $N_2$ feed stream. In some embodiments, inlets 102A include an $H_2$ feed stream and an $N_2$ feed stream. In some embodiments, the $H_2$ feed stream is fed in stoichiometric excess relative to the $N_2$ feed stream. In some embodiments, the $H_2$ feed stream and an $N_2$ feed stream are fed at about a 3:1 ratio. In some embodiments, conversion reactor 102 includes a heat source 102H. In some embodiments, heat source 102H is configured to maintain a desired temperature in conversion reactor 102 to help facilitate one or more reactions that produce the desired product. In some embodiments, heat source 102H is configured to bring the temperature inside the conversion reactor to at least above about 350° C. In some embodiments, conversion reactor 102A includes one or more effluent streams 102B. In some embodiments, one or more effluent streams 102B include the desired product. In some embodiments, one or more effluent streams 102B include an amount of ammonia. In some embodiments, one or more effluent streams 102B include excess reactant, e.g., $H_2$ and $N_2$.

Figure 2:
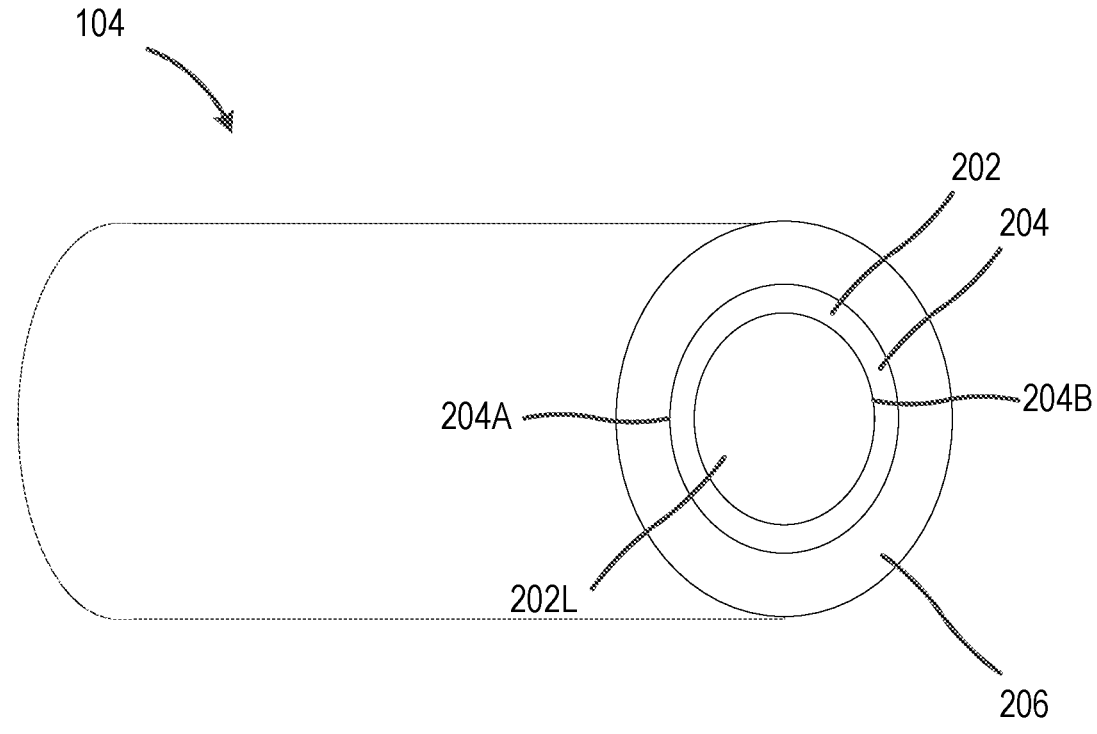
FIG. 2 is a schematic representation of a membrane separator according to some embodiments of the present disclosure.

In some embodiments, system 100 includes a membrane separator 104. In some embodiments, membrane separator 104 is positioned downstream of conversion reactor 102. In some embodiments, membrane separator 104 is positioned is positioned within conversion reactor 102. Membrane separator 104 is configured to selectively remove the desired product, e.g., ammonia, from effluent streams 102B. In some embodiments, at least one of effluent streams 102B include above about 5% ammonia. Referring now to FIG. 2, in some embodiments, membrane separator 104 includes one or more supports 202. In some embodiments, at least one of supports 202 is porous. In some embodiments, porous supports 202 include a plurality of pores and/or internal channels sized to accommodate one or more nanocrystals, e.g., having a particle size between about 50 nm and about 250 nm, as will be discussed in greater detail below. In some embodiments, the size of the pores/internal channels is between about 100 nm and about 500 nm. In some embodiments, the size of the pores/internal channels is about 400 nm. In some embodiments, supports 202 can be any suitable shape. In some embodiments, supports 202 are generally tubular in shape. In some embodiments, supports 102 include a lumen 202L. In some embodiments, supports 202 include a tubular sidewall 204. In some embodiments, tubular sidewall 104 has an external surface 204A and an internal surface 204B. In some embodiments, internal surface 204B encloses lumen 202L.

In some embodiments, supports 202 are composed of any suitable material capable of withstanding elevated temperatures and pressures, e.g., temperatures greater than about 100° C. and pressures greater than 25 psig. In some embodiments, supports 202 include a ceramic. In some embodiments, supports 202 are ceramic fibers. In some embodiments, the ceramic fibers are hollow.

In some embodiments, membrane separator 104 includes a membrane 206. In some embodiments, membrane 206 is selective for the desired products, e.g., those evolved within conversion reactor 102, facilitating separation of unwanted components, e.g., excess reactant, from the desired product. In some embodiments, membrane separator 104 is in fluid communication with one or more effluent streams 102B such that the components present therein are delivered to membrane 206. In some embodiments, membrane 206 is disposed on exterior surface 204A. In some embodiments, membrane 206 is disposed on interior surface 204B. In some embodiments, membrane 206 is freestanding, i.e., the not supported by supports 202 when in use in system 100. In some embodiments, membrane 206 is initially cast on support 202, which is subsequently removed prior to use in system 100. In some embodiments, membrane 206 includes a zeolite. In some embodiments, the zeolite is zeolite A, zeolite X, zeolite Y, or combinations thereof. In some embodiments, the zeolites include one or more cations. In some embodiments, the cations include Na$^+$. In some embodiments, membrane 206 includes NaA zeolite.

Figure 3A:
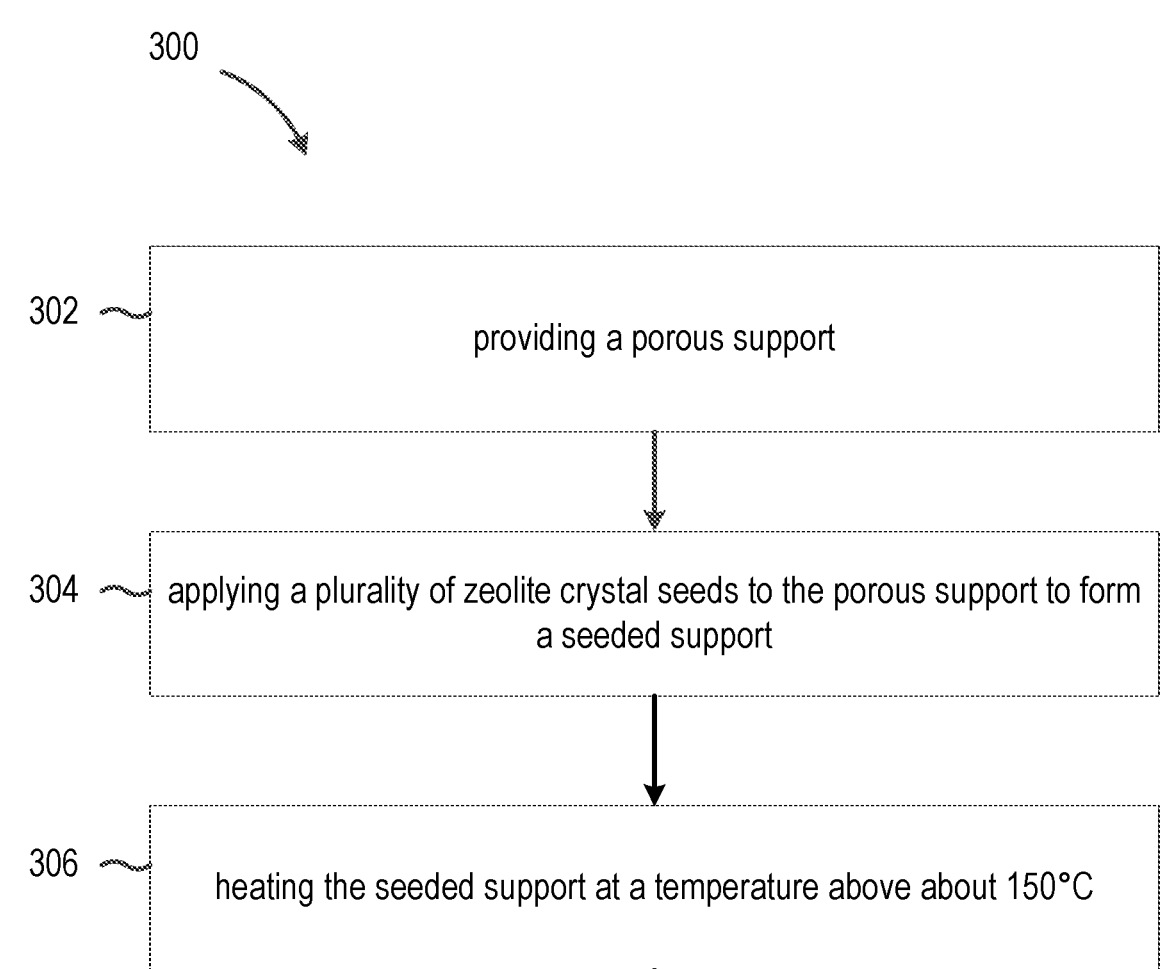
FIG. 3A is a chart of a method of making a membrane separator according to some embodiments of the present disclosure.

Referring now to FIG. 3, some embodiments of the present disclosure are directed to a method 300 of making a membrane separator for the isolating of a desired product, e.g., for ammonia production evolved via a Haber-Bosch process from N$_2$ and H$_2$ gas reactants. At 302, one or more porous supports are provided. As discussed above, in some embodiments, the porous supports include a plurality of pores and/or internal channels sized to accommodate one or more nanocrystals. In some embodiments, the porous support is generally tubular in shape. In some embodiments, the porous support includes a lumen. In some embodiments, the porous support is composed of any suitable material capable of withstanding elevated temperatures, e.g., temperatures greater than about 100° C. In some embodiments, the porous support includes a ceramic. In some embodiments, the porous support includes ceramic fibers. In some embodiments, the ceramic fibers are hollow.

Figure 3B:
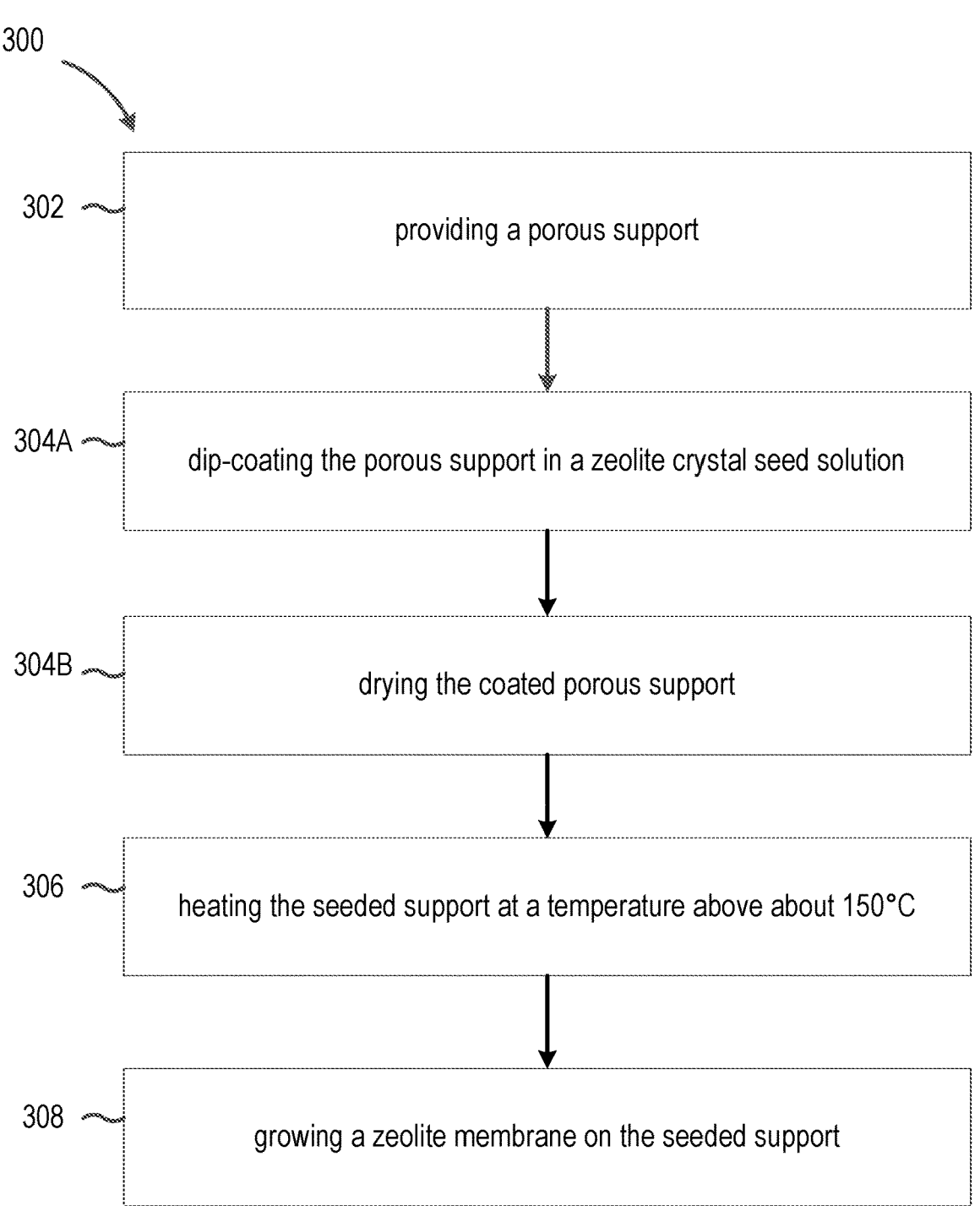
FIG. 3B is a chart of a method of making a membrane separator according to some embodiments of the present disclosure.

At 304, a plurality of nanocrystals are applied to the porous support to form a seeded support. As discussed above, in some embodiments, the nanocrystals have a particle size between about 50 nm and about 250 nm. In some embodiments, the nanocrystals have a particle size at least smaller than a pore size of the porous support. Thus, when applied to the porous support, the nanocrystals penetrate into the porous support to attach within as well to the surface of that support. In some embodiments, the nanocrystals are zeolite crystal seeds, e.g., NaA zeolite crystal seeds. Referring specifically to FIG. 3B, in some embodiments, at 304A, the nanocrystals are applied to the porous support by dip-coating the support in a solution including the nanocrystals, e.g., zeolite crystal seeds. At 304B, the dip-coated support is then dried. In some embodiments, the dip-coated support is dried at a temperature below about 100° C. In some embodiments, the dip-coated support is dried at a temperature below about 80° C.

Referring again to FIGS. 3A-3B, at 306, the seeded support is heated at an elevated temperature. In some embodiments, the seeded support is heated to about 150° C. In some embodiments, the seeded support is heated above about 150° C. In some embodiments, the seeded support is heated to about 200° C. In some embodiments, the seeded support is heated to above about 200° C. At 308, a membrane, e.g., NaA zeolite membrane, is grown on the seeded support. Without wishing to be bound by theory, heating 306 increases the binding strength between the nanocrystals and the porous support. Growth of the membrane takes place both in the pores and on the surface of the support, creating a consistent and dense layer of membrane interfacing closely with the support with reduced boundary defects. Reducing the boundary defects improves the selectivity of the membranes, and further allows them to maintain that selectivity even at challenging industrial conditions.

In some embodiments of the present disclosure, nano-sized zeolite seeds are hydrothermally synthesized. In some embodiments, the hydrothermal synthesis occurs at above about 50° C., 60° C., 70° C., 80° C., etc. In an exemplary embodiment, NaA zeolite seeds with molar composition of 1.8 Al$_2$O$_3$:11.25 SiO$_2$:0.6 Na$_2$O:13.4 (TMA)$_2$O:700 H$_2$O are synthesized according to the following procedure:

(1) 0.1361 g of sodium hydroxide (NaOH, 98 wt. %, Sigma-Aldrich), 13.8912 g of tetramethylammonium hydroxide pentahydrate (TMAOH·5H$_2$O, 97 wt. %, Sigma), 6.7 g of deionized (DI) water were mixed with vigorous agitation; after the solution was clear, 2.0816 g of aluminum isopropoxide (Al(i-C$_3$H$_7$O)3, 98 wt. %, Sigma-Aldrich) was added into the resultant solution, and stirred for 12 h at room temperature;

(2) 4.6875 g of Ludox colloidal silica (40 wt. % in water, Sigma-Aldrich) was added into the solution dropwise until the solution became clear;

(3) The resultant solution was transferred to an autoclave, sealed and then the autoclave was put into the oven that had been preheated to 100° C. After 3 h of hydrothermal synthesis, crystals were collected by repeated centrifugation at 10,000 rpm for 0.5 h and rinsing with DI water until the solution pH reached 9, and then were dried at 100° C. overnight.

NaA membranes were first commercialized in the 1990s for the dehydration of organic solvents due to their high stability and hydrophilicity. Without wishing to be bound by theory, H$_2$O (d=0.265 nm; μ=1.85 D) and NH$_3$ (d=0.260 nm; μ=1.47 D) share similar size and polarity and the NaA membranes of the present disclosure have been found to be highly selective for NH$_3$ separation. Stable membrane performance over 100 hours indicates that the membrane is capable of withstanding long term operation. Without wishing to be bound by theory, permeance and selectivity may decrease with increasing pressure. Changes in permeance and selectivity with temperature may be due to the morphological changes of the membrane and/or support.

Referring again FIG. 1, in some embodiments, the separation of a desired ammonia product from other unwanted components occurs in membrane separator 104 at elevated temperature, elevated pressure, or combinations thereof. In some embodiments, the separations occur above about 75° C. In some embodiments, the separations occur above about 100° C. In some embodiments, the separations occur above about 200° C. In some embodiments, the separations occur between about 100° C. and about 250° C. In some embodiments, membrane separator 104 is maintained at a temperature below about 200° C. In some embodiments, the separations occur at elevated pressure. In some embodiments, the separations occur above about 25 psig. In some embodiments, the separations occur above about 50 psig. In some embodiments, the separations occur above about 100 psig. In some embodiments, the separations occur above about 250 psig. In some embodiments, the separations occur above about 400 psig. In some embodiments, membrane separator 104 is maintained at a pressure between about 40 psig and about 510 psig.

Still referring to FIG. 1, system 100 includes an outlet stream 106 in fluid communication with membrane separator 104. In some embodiments, outlet stream 106 includes the desired products isolated in membrane separator 104, e.g., ammonia. In some embodiments, at least a portion of outlet stream 106 is fed to a processing module 108. Processing module 108 is configured to purify, concentrate, and/or prepare the desired products for use. In some embodiments, processing module includes a condenser. In some embodiments, system 100 includes a recycle stream 110 in fluid communication with membrane separator 104 and conversion reactor 102, e.g., via one or more inlets 102A. In some embodiments, recycle stream 110 includes a concentration of H$_2$ and N$_2$, i.e., the reactants remaining after an amount of ammonia is isolated from effluent streams 102B by membrane separator 104.

Referring now to FIG. 4, some embodiments of the present disclosure are directed to a method 400 of making ammonia. At 402, a system is provided that includes a conversion reactor and a membrane separator. As discussed above, in some embodiments, the membrane reactor includes one or more hollow porous supports and a membrane layer disclosed on the one or more hollow porous supports, the membrane layer including NaA zeolite. In some embodiments, the system includes an outlet stream in fluid communication with the membrane separator. In some embodiments, the system is consistent with the embodiments of system 100 discussed above. In some embodiments, the membrane layer is generally annularly shaped with an outer surface and an inner lumen, wherein the first surface is the outer surface, and the outlet stream is in fluid communication with the inner lumen. At 404, a reactants stream is fed to the conversion reactor. In some embodiments, the reactants stream including an $H_2$ component and an $N_2$ component. At 406, a reactant product stream is evolved from the conversion reactor. In some embodiments, the reactant product stream includes reaction products from a Haber-Bosch process. In some embodiments, the Haber-Bosch process is performed in the conversion reactor. In some embodiments the reactant product stream includes ammonia. In some embodiments, ammonia is generated according to Equation 1 below:

$$3H_2(g)+N_2(g) \leftrightarrow 2NH_3(g) \tag{1}$$

At 408, the reactant product stream is fed to a first surface of the membrane layer. In some embodiments, the reactant product stream is fed at a temperature below about 200° C. In some embodiments, the reactant product stream is fed at a temperature above about 200° C. In some embodiments, the reactant product stream is fed at a temperature above about 250° C. In some embodiments, the reactant product stream is fed at a pressure above about 290 psig. In some embodiments, the reactant product stream is fed at a pressure above about 435 psig. In some embodiments, the reactant product stream is fed at a pressure above about 580 psig. In some embodiments, the reactant product stream is fed at a pressure above about 725 psig. In some embodiments, the reactant product stream is fed at a pressure between about 40 psig and about 510 psig. At 410, ammonia is selectively transported from the reactant product stream through the membrane layer to the outlet stream. Preliminary experimental results and techno-economic analysis indicate that the membrane improves the efficiency of the current ammonia synthesis processes by reducing the energy necessary for $NH_3$ removal and the reheating of the $H_2$ and $N_2$ reactant gases, saving a considerable amount of energy and greatly reducing emissions compared with traditional $NH_3$ synthesis processes. At 412, the ammonia component is collected as a product from the outlet stream. In some embodiments, at least some of the $H_2$ component or $N_2$ component is recycled to the conversion reactor.

Referring now to FIG. 5, some embodiments of the present disclosure are directed to a method 500 of separating ammonia from a gaseous mixture. At 502, a feed stream is provided. In some embodiments, the feed stream includes a plurality of gaseous components. In some embodiments, the plurality of gaseous components includes an ammonia component. In some embodiments, the plurality of gaseous components includes an $H_2$ component, an $N_2$ component, or combinations thereof. At 504, a membrane separator is provided. In some embodiments, the membrane separator includes one or more hollow porous supports and a membrane layer disclosed on the one or more porous supports. In some embodiments, the membrane layer includes NaA zeolite. In some embodiments, the membrane layer is generally annularly shaped with an outer surface and an inner lumen, wherein the first surface is the outer surface, the second surface is adjacent the inner lumen, and the ammonia component is collected in the inner lumen. In some embodiments, the membrane separator is consistent with the embodiments of system 100 discussed above. At 506, the feed stream is fed to a first surface of the membrane layer. In some embodiments, the feed stream is fed at a temperature below about 200° C. In some embodiments, the feed stream is fed at a pressure between about pressure between about 40 psig and about 510 psig. At 508, the ammonia component is selectively transported from the feed stream through the membrane layer to a second surface of the membrane layer. At 510, the ammonia component is collected as a product. In some embodiments, the feed stream includes reaction products from a Haber-Bosch process. In some embodiments, the Haber-Bosch process is performed in a conversion reactor, and any $H_2$ component or $N_2$ component is recycled to the conversion reactor.

Methods and systems of the present disclosure are highly selective for $NH_3$ separation. The methods and systems are effective to replace and/or modify the energy-intensive condensation/recycling steps in the traditional Haber-Bosch process used to condense $NH_3$ from the exiting stream of the reactor that includes a mixture of $NH_3$, $H_2$ and $N_2$ gas. Using the synthesis method discussed herein, NaA membrane quality can be drastically improved and has high $NH_3$/gas selectivity at high temperatures and pressures (for example, $NH_3/H_2$ and $NH_3/N_2$ selectivities of 1,225 and >10,000, respectively, at 200° C. and 34.5 bar). The selectivity and scalability results of the methods and systems of the present disclosure have been shown to be reproducible.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A method of making ammonia, comprising:

feeding a reactants stream to a conversion reactor, the reactants stream including an $H_2$ component and an $N_2$ component;

evolving a reactant product stream from the conversion reactor, the reactant product stream including ammonia;

feeding the reactant product stream to a membrane separator;

selectively transporting ammonia from the reactant product stream through a membrane layer on the membrane separator to an outlet stream; and collecting the ammonia component as a product from the outlet stream, wherein the membrane separator includes:

one or more porous supports, the porous supports having zeolite nanocrystals seeded into pores of the supports, and heated to above about 200° C., thereby coating a surface of the supports to form a membrane-coated surface, the membrane-coated surface comprising the membrane layer disposed on the one or more porous supports, the membrane layer including NaA zeolite, wherein the zeolite nanocrystals have a particle size between about 50 nm and about 250 nm, and wherein the membrane separator provides $NH_3/H_2$ and $NH_2/N_2$ selectivities of at least about 1,220 and 10,000, respectively, at a temperature of 200° C. and a pressure of 34.5 bar.

2. The method according to claim 1, wherein the membrane layer is generally annularly shaped with an outer surface and an inner lumen, wherein the membrane-coated surface is the outer surface, and the outlet stream is in fluid communication with the inner lumen.

3. The method according to claim 1, wherein the reactant product stream is fed at a temperature below about 200° C.

4. The method according to claim 1, wherein the reactant product stream is fed at a pressure between about 40 psig and about 510 psig.

5. The method according to claim 1, wherein the reactant product stream includes reaction products from a Haber-Bosch reaction.

6. The method according to claim 5, wherein the Haber-Bosch reaction is performed in the conversion reactor, and any $H_2$ component or $N_2$ component is recycled to the conversion reactor.

7. The method according to claim 1, wherein the pores of the support are between about 100 nm and about 500 nm.

8. The method according to claim 1, wherein the one or more porous supports include hollow ceramic fibers.

\* \* \* \* \*